July 21, 1925.

G. VANNONI 1,546,955

HEEL FORMING MOLD

Filed March 12, 1925

INVENTOR.
Gino Vannoni
BY
ATTORNEY.

July 21, 1925.

G. VANNONI 1,546,955

HEEL FORMING MOLD

Filed March 12, 1925

INVENTOR.
Gino Vannoni
BY
ATTORNEY.

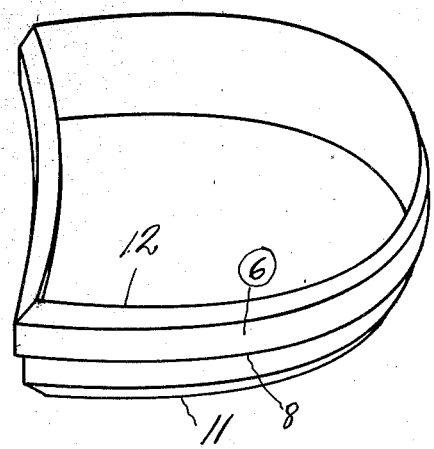
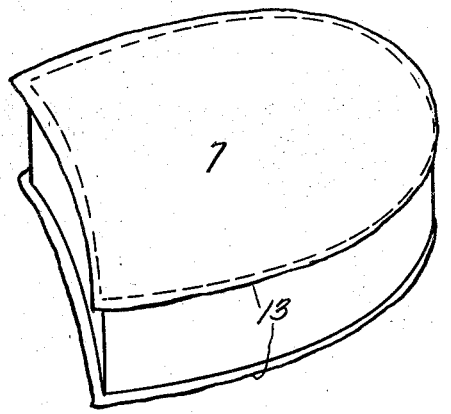
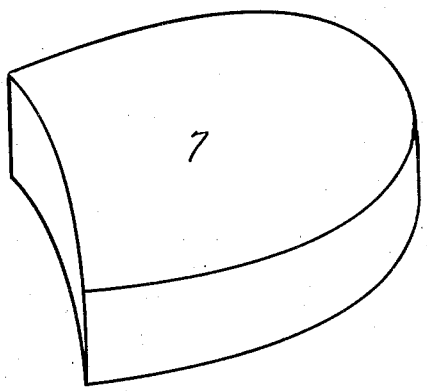

Patented July 21, 1925.

1,546,955

UNITED STATES PATENT OFFICE.

GINO VANNONI, OF MISHAWAKA, INDIANA.

HEEL-FORMING MOLD.

Application filed March 12, 1925. Serial No. 14,909.

*To all whom it may concern:*

Be it known that I, GINO VANNONI, a subject of the King of Italy, residing at Mishawaka, in the county of St. Joseph and State of Indiana, have invented certain new and useful Improvements in Heel-Forming Molds, of which the following is a specification.

The invention relates to heel forming molds for pressing to form a piece of raw stock forming rubber heels, and holding the stock in compressed form during the vulcanizing operation, and has for its object to provide a device of this kind wherein the compressed stock is carried in a shaping member, and a mold plate means for severing the web or flanges formed at the upper and lower ends of the heel, and which severing means is manually controlled.

A further object is to provide the presser plate with a chambered member registering with the heel cutter member and a shouldered filler block within the chambered member and cooperating with a shoulder in the chambered member whereby the filler block has its lower face in the same plane as the chambered member, and yieldably held in said position, and means whereby upon a continued downward movement of the presser plate and chambered member the filler block may be allowed to recede into the chamber of the chambered member for cooperating with the heel carried cutter for severing the webs at the upper and lower sides of the heel.

A further object is to provide the upper face of filler block with a plurality of recesses in communication with a central recess and a rotatable disc having a plurality of arms, which when out of registration with the recesses in the filler block, and interposed between the upper side of the filler block and the presser plate maintains the lower face of the filler block flush with the chambered member, and which arms when disposed in the recesses allow a downward movement of the chambered member and a receding of the filler block against the action of the spring for the web cutting operation.

A further object is to provide the under side of the presser plate with a groove, in which is slidably mounted a rod, the inner end of which is provided with a pin extending through an elongated slot in the rotatable disc carrying the arm, and which rod forms means whereby the operator may move the arms of the disc into registration with the recesses in the upper side of the filler block, or out of registration with said recesses as the disc is forced upwardly by the spring interposed between the disc and the filler block.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawings:—

Figure 6 is a perspective view of the heel former and cutter.

Figure 7 is a perspective view of a rubber heel, showing the webs at the upper and lower sides thereof.

Figure 8 is a perspective view of the rubber heel after the forming, vulcanizing and web cutting operations.

Figure 1:
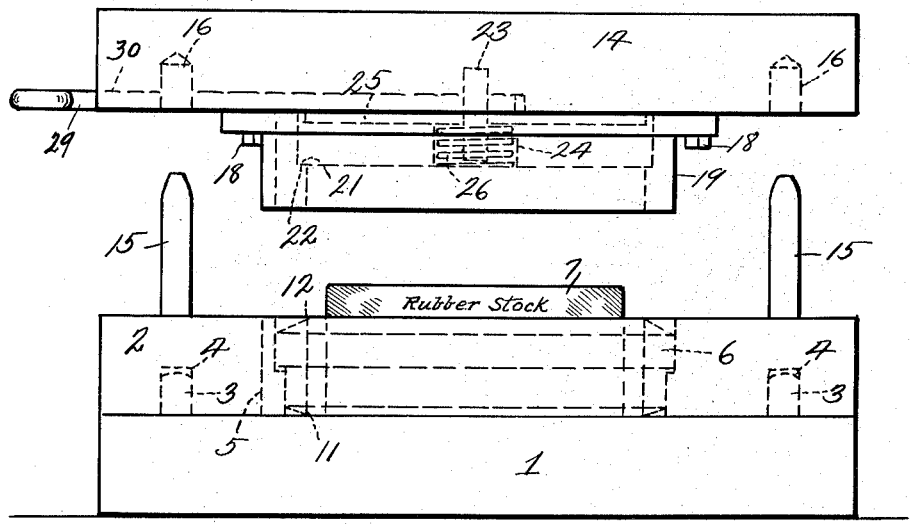
Figure 1 is a side elevation of the mold, showing the presser plate in position to be placed on the mold plate.

Referring to the drawings, the numeral 1 designates the base plate, and 2 the mold plate which is disposed on the base plate 1, and detachably connected thereto by means of dowels 3, which are disposed in recesses 4 in the mold plate, thereby allowing the mold plate to be easily removed from the base plate as desired and at the same time the dowels 3 maintain the plates 1 and 2 in registration. Disposed within the mold plate 2 in a chamber 5 thereof is a heel forming member 6, which member is the same shape as the heel 7 and is provided with a shoulder 8 extending entirely around the same, which shoulder cooperates with a shoulder 9 in the mold plate chamber 5 for limiting the downward movement of the heel forming member, particularly when the plate 2 is removed from the plate 1. Heel forming member 6 has its upper and lower edges provided with cutting edges 11 and 12 for severing the webs 13 from the heel 7 after the formation of the heel.

Figure 2:
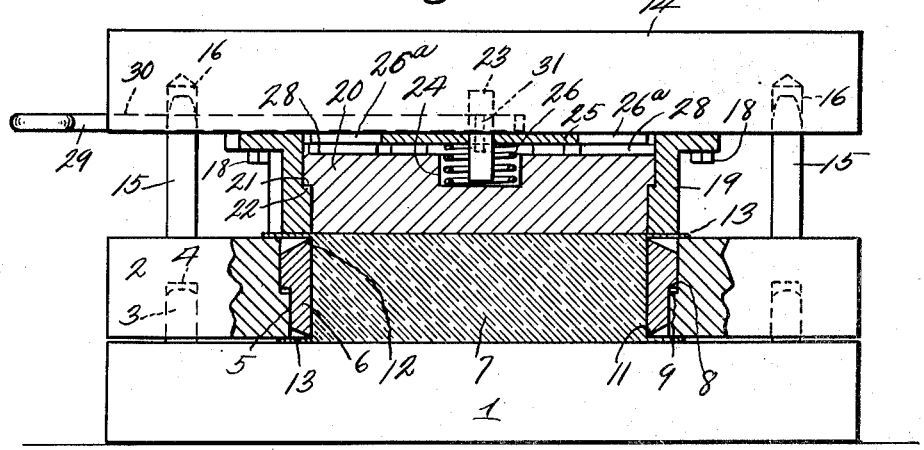
Figure 2 is a vertical longitudinal sectional view through the mold, parts being shown in elevation.
Figure 3:
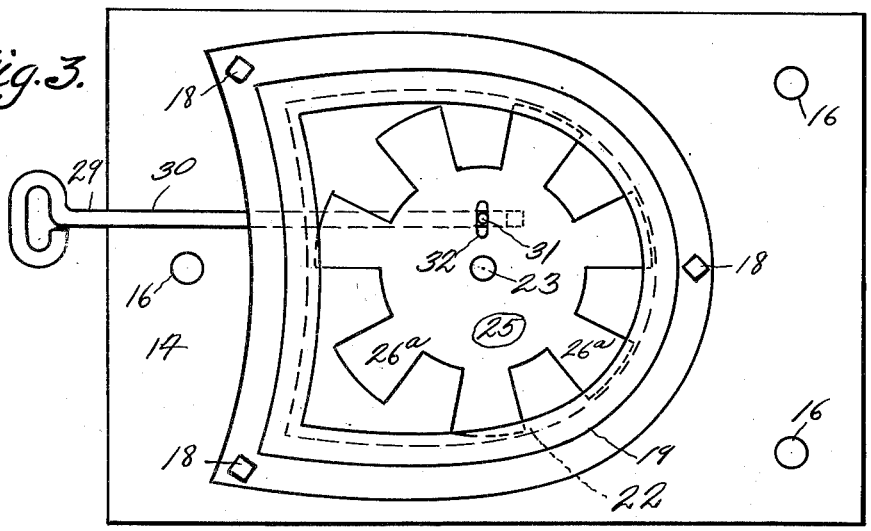
Figure 3 is a bottom plan view of the presser plate showing the rotatable disc and the filler block removed to better show the structure.
Figure 4:
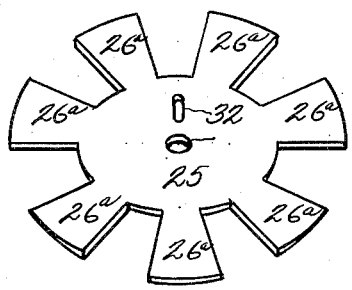
Figure 4 is a perspective view of the rotatable disc.
Figure 5:
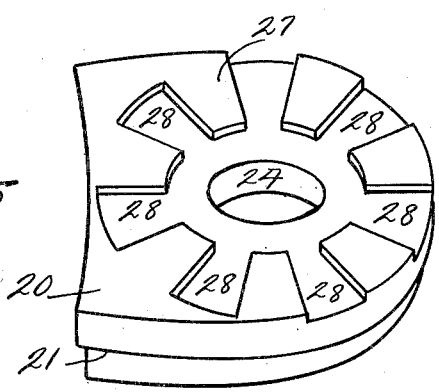
Figure 5 is a perspective view of the filler block.

Disposed above the mold plate 2 is a presser plate 14, which plate, when in position as shown in Figure 2, is held in registration with the plates 1 and 2 by means of dowel pins 15 carried by the mold plate 2, and which dowel pins are received in apertures 16 of the presser plate 14, therefore it will be seen that the presser plate is not only held in registration so it can move upwardly and downwardly in proper registration, but can be easily and quickly removed from its position as shown in Figure 2, when it is desired to remove the heel forming member 6 from the mold plate 2 after the formation of the heel, or for other purposes. Secured to the under side of the presser plate 14 by means of bolts 18 is a chambered member 19 of substantially the same shape as the heel forming member 6, and in which chambered member 19 is disposed a filler block 20, which filler block is provided with a shoulder 21 extending entirely around the same, which cooperates with a shoulder 22 in the chambered member 19 for limiting the downward movement of the filler block 20 to a position where its lower side will register with the lower side of the chambered member 19. It will be noted that the filler block 20 is of less thickness than the depth of the chamber of the chambered member, the purpose of which will presently appear. Extending downwardly from the under side of the presser plate 14 is a pin 23, which pin extends into a recess 24 in the upper side of the filler block, and surrounding the pin 23, and interposed between a rotatable disc 25 and the bottom of the recess 24 is a coiled spring 26, which coiled spring normally maintains the filler block 20 in its lower position and yieldably holds said filler block in lower position as shown in Figure 2. Rotatable disc 25 is provided with a plurality of radially disposed arms 26ª, which arms, when in engagement with the upper side 27 of the filler block 20, hold said filler block with its lower face flush with the lower side of the chambered member 19, consequently when pressure is applied to the presser plate during the heel forming operation the filler block can not recede under the pressure into the chambered member 19. However when the disc 25 is partially rotated until its arms 26ª are in registration with the recesses 28 in the upper side of the filler block 20, a continued downward movement of the presser plate for severing the webs will force the filler block 20 upwardly against the action of the coiled spring 26, and as the arms 26 are received in the recesses 28, they will not interfere with the downward movement of the chamber member 18. Chambered member 19, as it continues downwardly, severs the upper web 13 against the upper cutting edge 12 of the heel forming member 6 and at the same time forces the heel forming member 6 downwardly for severing the lower heel carried flange 13. Flanges 13 have heretofore been severed by hand, which has been an expensive operation.

In practice the parts are pressed together by a power press having a chambered table and a chambered movable press plate to which chambers steam is admitted to heat the parts, and by conduction heat the plates of the mold and thus secure or vulcanize the rubber to set the same in the form of the heel forming member 6, however before such securing takes place the present improvement contemplates the severing of the webs 13 so that the heel will be ready trimmed and ready for use as it is removed from the heel forming member 6. This is accomplished as follows: After the initial pressing action of the presser plate, which causes the surplus rubber stock to be squeezed outwardly above and below the heel forming member 6 to form the webs 13, the operator grasps the rod 29 and pulls outwardly on the same. The rod 29 is slidably mounted in a channel 30 in the presser plate 14, and has its inner end provided with a pin 31 disposed in an elongated slot 32 of the disc 25, and which outward movement of the rod 29 will rotate the disc 25 until its arms 26ª register with the recesses 28 in the filler block 20, thereby permitting the filler block 20 to recede under pressure against the action of the coiled spring 26. Following this step another slight pressure movement is applied to the mold parts, which through the yielding of the filler block 20 permits the edge of the chambered member 19 to force the webs against the sharp edges of the heel forming members 6, and by the same movement force the heel forming members 6 downwardly so that the lowered sharpened edge thereof will cut through the lower web 13 and thus clearly sever both the upper and lower webs from the body of the molded heel. After this operation the mold parts are allowed to remain in the power press a sufficient time for the curing of the molded heel, and after which and upon removal of the mold from the press the mold parts may be readily separated and access had for the removal of the formed heel from the heel forming member 6, manually or in any other manner. In practice plates 1, 2 and 14 may be large enough to carry as many units as shown for forming as many heels in the same operation as desired.

From the above it will be seen that a heel forming mold is provided which is simple in construction, easily assembled and disassembled and one wherein a receding filler block is used for facilitating the web cutting operation, and locking means is provided in connection with said filler block for holding the filler block flush with the lower side of the chambered member during the forming of the heel when pressure is applied to the raw stock and for allowing the filler block to recede in the chambered member when desired during a web cutting operation.

The invention having been set forth what is claimed as new and useful is:—

1. The combination with a mold comprising a base plate, a mold carrying plate, an article forming member within the mold plate and having upper and lower cutting edges, a presser plate disposed on the mold plate, a filler block disposed in a chamber in the under side of the presser plate and having its lower side in registration with the lower side of the presser plate, the lower side of the presser plate cooperating with the cutting edges of the article forming member for severing webs therefrom, of means whereby said filler block may be allowed to recede in the chamber of the presser plate.

2. The combination with a heel forming mold having means for severing webs from the upper and lower sides of a heel and comprising a base plate, a mold carrying plate, a web cutting and heel forming member in the mold plate, a presser plate, of a chambered member carried by the under side of the presser plate and adapted to cooperate with the heel forming and web cutting member for severing the web from a heel upon a downward movement thereof, of a filler block slidably mounted in the chambered member and having its lower side registering with the lower side of the chambered member, means for normally forcing said filler member downwardly, means for limiting the downward movement of the filler block, and locking means for locking said filler block against upward movement in the chambered member.

3. The combination with a heel forming and web cutting mold comprising a cutting member disposed in a mold plate supported on a base plate, a presser plate, of a chambered member carried by said presser plate and adapted to cooperate with the cutter member, a filler block slidably mounted in the chambered member, yieldable means cooperating with the filler block for forcing the same downwardly and maintaining its lower side in registration with the lower side of the chambered member, and locking means cooperating with said filler block for locking the same in lower position and allowing the filler block to recede in the chambered member.

4. The combination with a heel forming and web cutting mold having a heel forming and cutting member adapted to form and cut webs from a heel formed therein, a presser plate, of a chambered member carried by said presser plate and cooperating with the web cutting member, a filler block slidably mounted in said chambered member, means for limiting the outward movement of the filler block, means for normally forcing said filler block outwardly and maintaining the same with its lower side in the plane of the lower end of the chambered member, and means cooperating with the filler block for allowing said block to recede in the chambered member during a web cutting operation.

5. The combination with a heel forming and web cutting mold having a presser plate provided with a chambered member for cooperating with the cutting mechanism of the mold for severing webs therefrom, a filler block slidably mounted in the chambered member, of means for positively holding said filler block in outer position or allowing the same to recede in the chambered member.

6. The combination with a heel forming and web cutting mold having a presser plate provided with a chambered member cooperating with the cutting mechanism of the mold for severing webs therefrom, a filler block slidably mounted in the chambered member and provided with recesses in its upper side, of a plate rotatably mounted within the chambered member, said plate being provided with arms adapted to be placed in registration with the recesses in the filler block for allowing the filler block to recede in the chambered member.

7. The combination with a heel forming and web cutting mold having a presser plate provided with a chambered member cooperating with cutting mechanism of the mold for severing webs therefrom, a filler block slidably mounted in the chambered member and provided with recesses in its upper side, a rotatable plate interposed between the filler block and presser plate, a plurality of arms carried by the rotatable plate and adapted to be placed in registration with the recesses in the filler block for allowing the filler block to recede in the chambered member, a spring interposed between the rotatable plate and the filler block and normally forcing said filler block outwardly, means for limiting the outward movement of the filler block, a rod slidably mounted in the presser plate, and a pin and slot connection between the rod and the rotatable plate.

8. The combination with a heel forming and web cutting mold having a pressure plate provided with a member cooperating with the cutting mechanism of the mold for severing webs from heels, a filler block slidably mounted in said member and limited in its downward movement therein, of means for locking said filler block against movement and allowing said filler block to move inwardly, said means comprising a rotatable disc interposed between the pressure plate and the filler block, said rotatable plate being provided with arms adapted to be moved into and out of registration with recesses in the filler block, and means for controlling the rotation of said rotatable plate.

9. The combination with a slidably mounted filler block carried by a presser plate of a heel forming and web cutting mold, of a rotatable disc interposed between the filler block and plate, arms carried by said rotatable disc and adapted to be moved into and out of registration with recesses in the filler block for allowing and preventing movement of the filler block, means for rotating said disc, and spring means interposed between the disc and the filler block and normally forcing said filler block outwardly.

10. The combination with a slidably mounted filler block carried by a presser plate of a heel forming and web cutting mold, of a rotatable disc interposed between the filler block and plate, arms carried by said rotatable disc and adapted to be moved into and out of registration with recesses in the filler block for allowing and preventing movement of the filler block, and means for controlling the rotation of the disc.

In testimony whereof I affix my signature.

GINO VANNONI.